Sept. 6, 1966  J. B. GUIN  3,270,795
NON-SKID TIRES
Filed Jan. 29, 1965

INVENTOR
Joel B. Guin

United States Patent Office 3,270,795
Patented Sept. 6, 1966

3,270,795
NON-SKID TIRES
Joel B. Guin, 148 E. 48th St., New York, N.Y.
Filed Jan. 29, 1965, Ser. No. 428,917
5 Claims. (Cl. 152—211)

The present invention relates to non-skid tires.

The multitude of non-skid tire devices developed heretofore have one or more of the following shortcomings. They are: too costly; too complicated; too fragile; too rough on the tires themselves; too rough on the road surfaces; effective only under certain weather conditions; effective only on certain road surfaces. Some devices even make conditions worse under specific circumstance: e.g. at some speeds, tire chains will cause tires to skid far worse on wet, slick concrete or brick road surfaces; at other speeds tire chains will skid worse on very hard ice; chains and other devices can hold back grovel or rock on a hard paved surface in such way that the rock acts as a ball or roller bearing, carrying the car much farther in the skid than would the mere rubber tire; in one unique case, after braking at only 15 m.p.h. on a dry concrete surface, the writer's tire chains held a single rock in such a way to act as a skid which spun the car around in a 270 degree turn.

The object of the present invention is to avoid most of the above-named fault: to provide a simple, inexpensive sturdy non-skid device that is effective in all sorts of weather, on all types of road surfaces without damage to the tire itself. A distinctive object is to give increased traction and skid protection at lowest temperatures when usual traction is least and danger is greatest. A further object is to strengthen the tire peripherally and diagonally by means of strong metallic or non-metallic wires running completely around the tire near the tread edges and strong metallic or non-metallic springs running obliquely across the tread and intersecting both wires. Other objects will appear on examination of the drawings:

Figure 1:
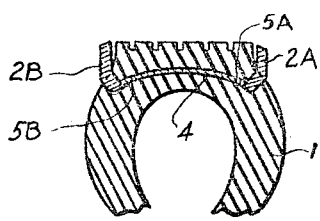
FIG. 1 is a vertical section through the tire showing the entire configuration of the non-skid device.

Referring now to the drawings, FIG. 1 shows the various parts of the non-skid device in cross section 2B, the metallic or non-metallic spring 4 attached to the lower end of said studs 2A and 2B and imbedded in the tread of tire 1, and the metallic or non-metallic wires 5A and 5B intersecting said springs and also imbedded in the tread of tire 1.

Figure 2:
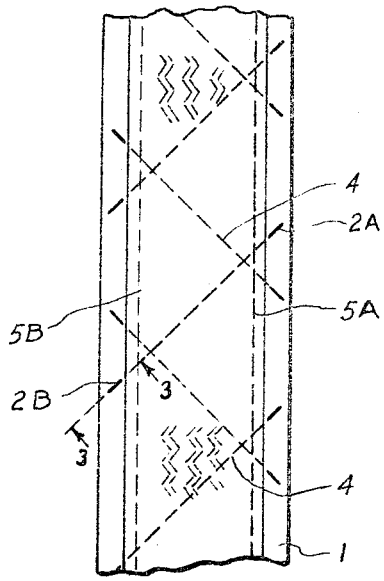
FIG. 2 is a top view of the tire showing the criss-cross arrangement of the springs, the non-skid studs attached thereto, and the internal intersecting wires.

FIG. 2 shows springs 4 criss-crossed so as to cause the stud on the forward end to try to dig deeper into ice or snow (at 2A) and the stud on the rearward end (at 2B) to scrape on the surface, thus tending to eliminate skidding to right or left, as well as forward skidding. Imbedded wires 5A and 5B intersect all of the springs 4 holding them firmly, further strengthening the tire and integrating the entire non-skid system.

Figure 3:
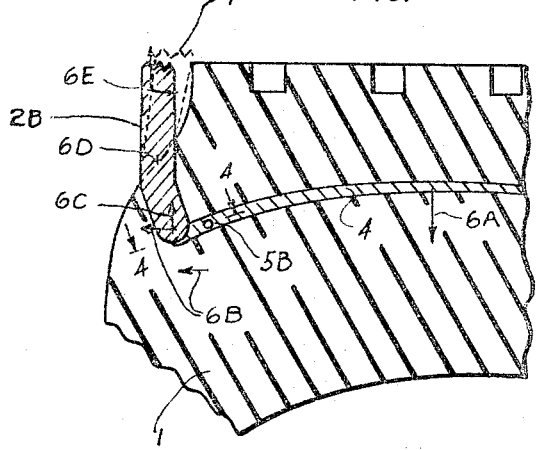
FIG. 3 is a vertical section taken along line 3—3 in FIG. 2.

FIG. 3 is an enlarged vertical section taken obliquely across the tread along line 3—3 in FIG. 2. Metallic or non-metallic wire 5B runs through metallic or non-metallic spring 4. Non-skid stud 2B is shown in the ineffective or idle position; dotted lines 7 show the stud in effective or active position.

Figure 4:
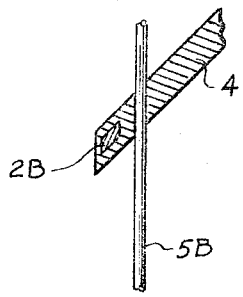
FIG. 4 is a horizontal section taken along line 4—4 in FIG. 3.

FIG. 4 is a horizontal cross-section taken along line 4—4 in FIG. 3 and shows spring 4 intersecting wire 5B, and attached stud 2B held by spring 4.

The non-skid device works as follows: reduced temperatures resulting from snow, sleet, ice or rain automatically lower the air pressure in the tires, flattening part of the tire against the road surface, in the direction of arrow 6A, FIG. 3, and carrying spring 4 with it. This straightens spring 4, thus pushing the ends which are attached to studs 2B, outward in the direction of arrows 6B. The lower part of stud 2B is thus pushed leftward in the direction of arrow 6B, and also upward in the direction of arrow 6C because wire 5B acts as a fulcrum or axis. The leftward movement of stud 2B is reversed at 6D because the tread at this point acts as a fulcrum or bearing, causing the upper part of the stud to move upward and to the right as shown by arrows 6E. These combined movements bring the non-skid device, formerly at 2B, into the approximate position of dotted lines 7. The lower the temperature the higher is this final position 7.

I claim:
1. In combination:
   an automobile tire;
   a series of springs around the periphery of the tire, each spring being made of a durable material, imbedded in and running diagonally across the tread and deflectable toward the center of the tire when said tread is depressed inward; and
   multiple non-skid studs, one attached near each of the ends of said springs, made of strong durable material, and movable outward beyond the periphery of said tire to impinge on the road surface in proportion as the mid-portion of said springs is deflected inward by the depressing of the tread toward the tire center.

2. The substance of claim 1 with said non-skid studs being made of hard metal attached near the ends of said springs and movable outward through and beyond the periphery of said tire to impinge on the road surface and prevent skidding as said springs are deflected inward, and being retractable inward as tire pressure rises due to warmer air and road surfaces, the damage to which is thereby held to a minimum.

3. The combination of claim 1, said springs being made of a strong, tough metal and shaped so as to strengthen the tire diagonally and help prevent blow-outs at high speeds and under heavy loads.

4. The combination of claim 1 and two or more wires made of a hard, strong, durable material imbedded in said tread, at least one wire on each side of the tread, surrounding the periphery and running through said springs a suitable distance from the ends thereof to permit it to serve as the fulcrum on which the depressing springs are levers moving the studs outward.

5. The combination of claim 4, said wires being made of a strong, tough metal and of such shape as to strengthen the tire peripherally and radially, thus helping prevent blow-outs at high speeds and under heavy loads.

References Cited by the Examiner

UNITED STATES PATENTS

| | | | |
|---|---|---|---|
| 1,378,605 | 5/1921 | Netter | 152—189 |
| 2,132,614 | 10/1938 | Gray | 152—211 |
| 3,147,790 | 9/1964 | Viscardi | 152—208 |

FOREIGN PATENTS

| | | |
|---|---|---|
| 472,501 | 9/1937 | Great Britain. |

ARTHUR L. LA POINTE, *Primary Examiner.*

C. W. HAEFELE, *Assistant Examiner.*